United States Patent
Meinsen

(10) Patent No.: US 7,664,792 B2
(45) Date of Patent: *Feb. 16, 2010

(54) SYSTEM AND METHOD FOR RECOVERING DATABASES ON A MAINFRAME COMPUTER

(75) Inventor: David Meinsen, Independence, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/656,590

(22) Filed: Jan. 22, 2007

(65) Prior Publication Data

US 2008/0177804 A1 Jul. 24, 2008

(51) Int. Cl.
*G06F 17/30* (2006.01)
(52) U.S. Cl. .................. 707/202; 707/100; 707/102; 707/200; 707/203; 707/204
(58) Field of Classification Search ............. 707/100, 707/102, 200, 202, 203, 204; 714/16, 20
See application file for complete search history.

(56) References Cited

U.S. PATENT DOCUMENTS

| | | | |
|---|---|---|---|
| 5,778,387 A * | 7/1998 | Wilkerson et al. ........... 707/202 |
| 2004/0250033 A1* | 12/2004 | Prahlad et al. .............. 711/162 |
| 2005/0240815 A1* | 10/2005 | Purkeypile et al. ............ 714/15 |
| 2006/0101384 A1* | 5/2006 | Sim-Tang et al. ........... 717/104 |
| 2006/0236151 A1* | 10/2006 | Costlow et al. ............... 714/16 |

OTHER PUBLICATIONS

Non-Final Office Action date mailed Jan. 23, 2009 for U.S. Appl. No. 11/656,591.
Response filed Apr. 16, 2009 to Non-Final Office Action date mailed Jan. 23, 2009 for U.S. Appl. No. 11/656,591.

* cited by examiner

*Primary Examiner*—Cam-Linh Nguyen
(74) *Attorney, Agent, or Firm*—Sonnenschein Nath & Rosenthal LLP

(57) ABSTRACT

A system and method for performing database recovery operations. A mainframe computer may include multiple databases stored on a storage unit. A processing unit may be configured to receive and schedule jobs submitted for execution. An electronic display may be in communication with the processing unit. A software program may be executed by the processing unit and be configured to cause the processing unit to (i) display a menu of selectable database recovery operations on the electronic display, (ii) receive a selection of a database of the databases on which to perform a database recovery operation, (iii) display a list of valid database recovery timestamps, (iv) display a database recovery parameter entry screen in response to receiving a database recovery operation selection, and (v) generate information including parameters entered in the database recovery parameter entry screen for use in performing the selected database recovery operation on the selected database.

18 Claims, 4 Drawing Sheets

```
IMS1 ------------------ Recovery Points for DBDs or PSBs ---------------- 04.336
COMMAND ===>
                   ╱—402
Type of objects: ___ (D for DBDs, G for DBDSGRPs, or P for PSBs)
              ╱—404            ╱—406
From Time: _____  To Time: _____  (yydddhhmmsst)
                  ╱—408
Source of objects: ___ (D for a dataset or P for panel entry)
                            ╱—410                          412
Dataset = _____
or
Panel = ____  ____  ____  ____  ____  ____  ____  ____
        ____  ____  ____  ____  ____  ____  ____  ____
        ____  ____  ____  ____  ____  ____  ____  ____
        ____  ____  ____  ____  ____  ____  ____  ____
        ____  ____  ____  ____  ____  ____  ____  ____
        ____  ____  ____  ____  ____  ____  ____  ____
        ____  ____  ____  ____  ____  ____  ____  ____

Press ENTER KEY to process, or END KEY to terminate.
```
400

FIGURE 4

```
IMS1 -------------------- Recover Databases ------------------ 04.336
COMMAND ===> _____
                    ╲—508
Specify the following processing information:
    Recover to Time: _____ (yydddhhmmsst or LASTIC)
                         ╲—502        504
    SMF  Account Number   7000
    JOB  Run Type         PROD
    JOB  Programmer Name  OPERATIONS
    JOB  Execution Class  A
    JOB  MSGCLASS         R Perform Recovery      N    (Y = yes, N = scan)      506

DBDs  ____  ____  ____  ____  ____  ____  ____  ____
          ____  ____  ____  ____  ____  ____  ____  ____
          ____  ____  ____  ____  ____  ____  ____  ____
          ____  ____  ____  ____  ____  ____  ____  ____
          ____  ____  ____  ____  ____  ____  ____  ____
          ____  ____  ____  ____  ____  ____  ____  ____
          ____  ____  ____  ____  ____  ____  ____  ____
```
500

FIGURE 5

SYSTEM AND METHOD FOR RECOVERING DATABASES ON A MAINFRAME COMPUTER

BACKGROUND

Companies in many different industries handle large database operations using mainframe computers. One such industry is the telecommunications industry, where databases are used to store detailed subscriber records. These databases are large and require routine maintenance to manage them due to a number of reasons, including crashes, updates, corrections, and verifications.

One mainframe manufacturer is International Business Machines (IBM). IBM also provides a database software program known as Information Management System (IMS), which can manage very large databases (e.g., hundreds of Gigabytes). Databases managed by the IMS system are configured as hierarchical databases. IM software is expensive to license and is individually operated on mainframe computers (i.e., one license per computer). By running multiple IMS subsystems on a single machine, software licensing costs can be reduced.

As understood in the art, mainframe computers operate by processing jobs that are scheduled in a queue. These jobs are formed by a series of statements or commands that are processed by a processor of the mainframe computer. Jobs are generally statements formatted in the job control language (JCL). Typically, a mainframe computer runs a job by scheduling and executing a file with JCL commands or statements configured for the mainframe computer to perform a task, such as re-loading a database from a certain time. In addition to the file with JCL statements, control cards are used to set parameters for the jobs. The control cards are typically eighty-byte strings that have each byte and groups of bytes representative of the different parameters. The JCL commands and control cards are comprehensive and generally require well-trained database administrators to adequately generate proper job files and control cards to perform even routine procedures and maintenance on IMS databases.

To aid database administrators, IBM and BMC provide database utilities. These utilities are JCL programs that are configured to perform certain functions. The database administrator, however, must generate a control card for each job. This process is time consuming, costly, and reliant on a limited number of skilled employees. Even with skilled employees, it is not uncommon for run-time errors to be caused by improperly written control cards. Others have created different utility programs, but these, too, require control cards having different formats to be generated by the user.

SUMMARY

To overcome the difficulties of using database recovery operations on mainframes, minimize costs of staffing a database with database administrators, reduce licensing fees, and increase the speed at which database recovery jobs can be created, the principles of the present invention provide for a system with a database recovery operation menu or panel that is intuitive and provides a user with selectable database recovery operations. The database recovery operations menu enables a user to select from multiple databases located on the same mainframe computer on which to perform database recovery operations, thereby reducing licensing fees and providing increased database management flexibility. In response to a user selecting a database recovery operation, a respective database recovery parameter entry screen is provided to the user for entering parameters to run a database recovery operation in a particular manner. Resulting from the database recovery parameter entry screen, the system generates a JCL command file and control cards that can be submitted as a job to perform the database recovery operation. By providing such intuitive screens, automatically generating JCL command files and control cards, and providing easy to read and understand reports, developers may perform database recovery operations on databases with little or no assistance from a database administrator.

One embodiment for implementing the principles of the present invention includes a system and method for performing database recovery operations. A mainframe computer may include a multiple databases stored on a storage unit. A processing unit may be configured to receive and schedule jobs submitted for execution. An electronic display may be in communication with the processing unit. A software program may be executed by the processing unit and be configured to cause the processing unit to (i) display a menu of selectable database recovery operations on the electronic display, (i) receive a selection of a database of the databases on which to perform a database recovery operation, (iii) display a list of valid database recovery timestamps, (iv) display a database recovery parameter entry screen in response to receiving a database recovery operation selection, and (v) generate information including parameters entered in the database recovery parameter entry screen for use in performing the selected database recovery operation on the selected database.

BRIEF DESCRIPTION OF THE DRAWINGS

Illustrative embodiments of the present invention are described in detail below with reference to the attached drawing figures, which are incorporated by reference herein and wherein:

FIG. 4 is a screenshot of an exemplary database recovery parameter entry screen that enables a user to enter parameters used in performing the selected database recovery option from the list of database recovery research options of FIG. 3;

FIG. 5 is another screenshot of an exemplary database recovery parameter entry screen for a user to enter parameters and run a database recovery job.

DETAILED DESCRIPTION OF THE DRAWINGS

Figure 1:
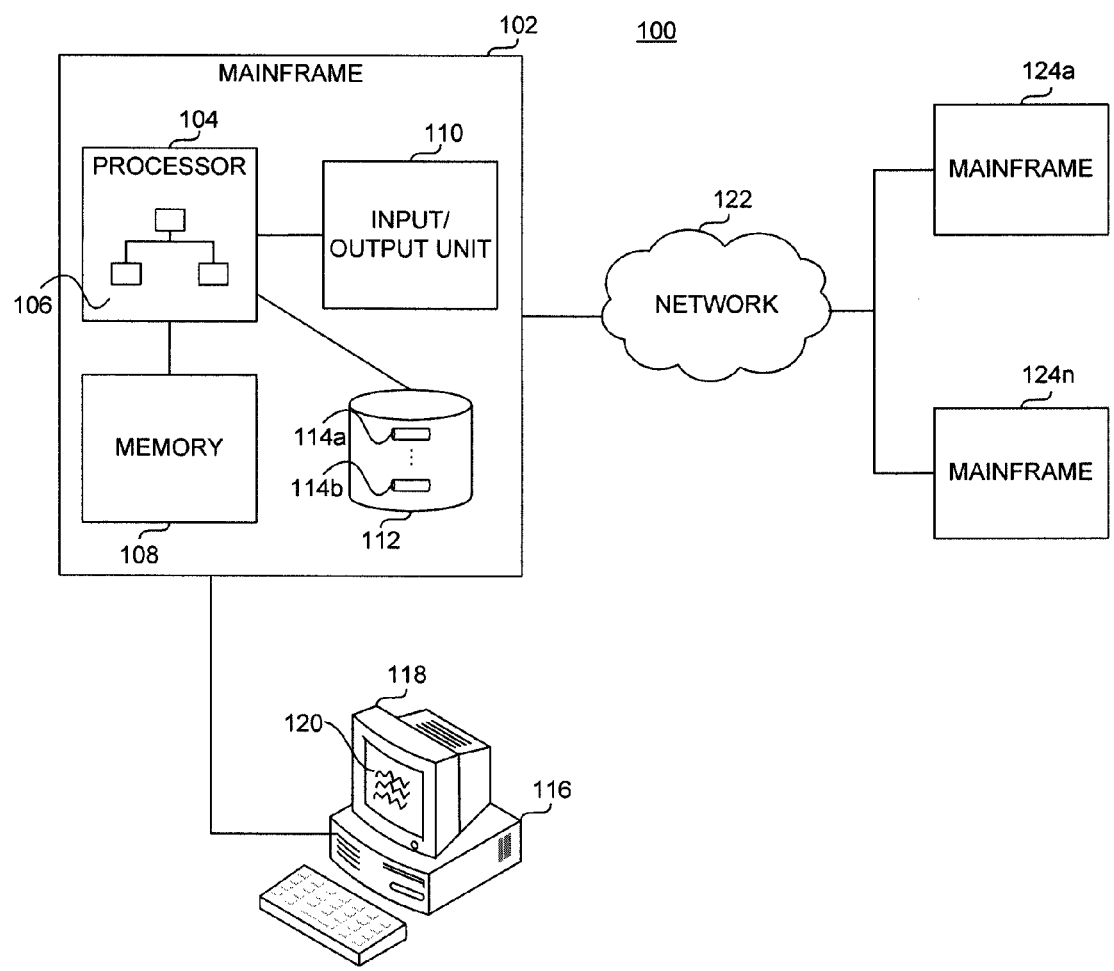
FIG. 1 is an illustration of an exemplary system that includes a mainframe computer on which the principles of the present invention may be operated.

FIG. 1 is an illustration of an exemplary system 100 that includes a mainframe computer 102 on which the principles of the present invention may be operated. The mainframe computer 102 includes one or more processors 104 that execute software 106. The processor(s) 104 may be in communication with memory 108, input/output (I/O) unit 110, and storage unit 112. The storage unit may store databases 114*a* and 114*b* (collectively 114). The databases 114 may be hierarchical databases, such as IMS databases produced by IBM Alternatively, the databases 114 may be relational database, such as DB2 databases produced by IBM In accordance with the principles of the present invention, the databases are both located on the same storage unit 112, but contain different data. For example, in the case of the databases 114 being used in the telecommunications industry, the databases 114a and 114b may store information associated with subscribers of two different states.

A user interface device 116, such as a terminal, personal computer, or otherwise, may include an electronic display 118 that displays text and/or images 120 thereon. The user interface device 116 may be utilized by a user, such as a database administrator, developer, or otherwise, to interact with the databases 114. In addition, the mainframe computer 102 may be in communication with a network 122 to which other mainframe computers 124a-124n (collectively 124) are in communication. These other mainframe computers 124 may store one or more databases and be utilized by other parts of a corporation, such as a telecommunications service provider, for storing and operating databases thereon.

In operation, the mainframe computer 102 may execute the software 106 for operating the databases 114 stored in the storage unit 112. In accordance with the principles of the present invention, the software 106 may include a database recovery system that enables multiple databases to be stored on a single system and utilize the database recovery processes on the multiple databases. The software 106 further provides intuitive user-interfaces that are capable of generating JCL command files that include parameters, thereby eliminating the need for control cards to be used during execution of a job as the parameters entered by a user are included in the JCL command file.

Figure 2:
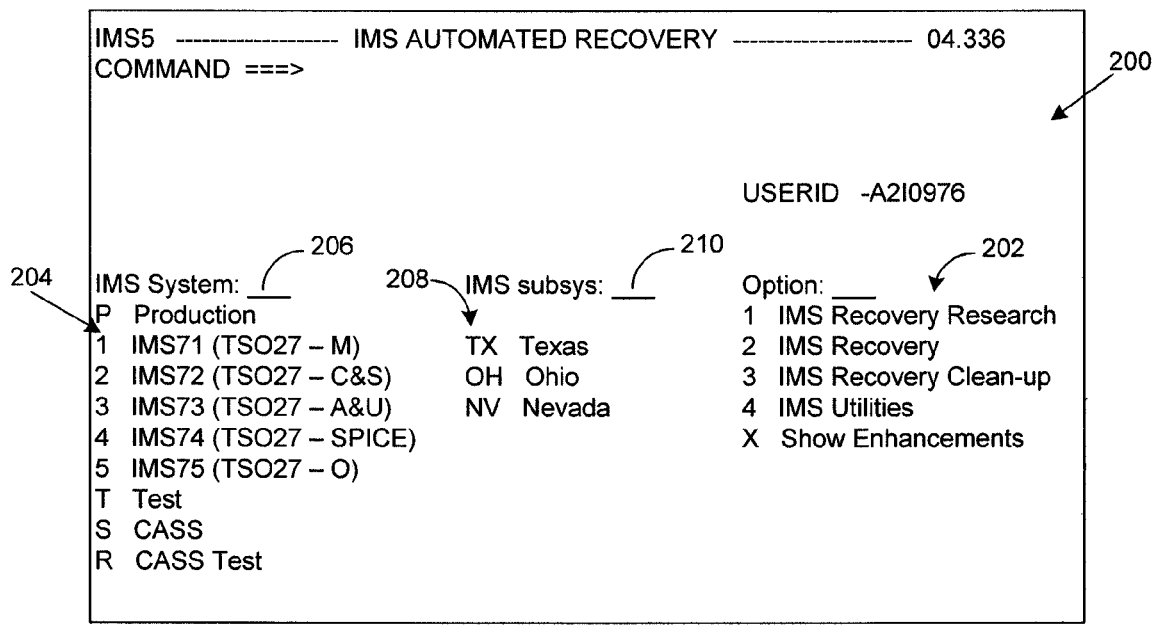
FIG. 2 is a screenshot of an exemplary main menu that provides a user with a list of selectable database recovery options to perform on a database.

FIG. 2 is a screenshot of an exemplary main menu 200 that provides a user with a list of selectable database recovery options 202 for performing on a database. The principles of the present invention utilize IMS databases as an example databases, but it should be understood that other hierarchical and/or relational databases operating on a mainframe computer or any other computing system that utilizes jobs to execute functions on databases may utilize the principles of the present invention. In addition to a list of selectable database recovery options 202 being available for a user, an IMS system list 204 may be available for a user to select an IMS system by entering an indicator of a system (e.g., "P" for production system) in text entry field 206. An IMS subsystem list 208 may be displayed for a user to select a subsystem in text entry field 210. For example, the user may select a production system by entering a "P" in text entry field 206 and subsystem "TX" in IMS subsystem text entry field 210, where TX is a database located on the storage unit containing information of customers located in Texas.

The software enables multiple subsystems to be located on the same mainframe computer. By enabling the user to access multiple subsystems on the same mainframe computer, the operator of the database is able to save both licensing fees and costs for purchasing and operating a second mainframe computer on which the database would otherwise have to be maintained. In response to the user selecting a database recovery option, a database recovery parameter entry screen (FIG. 5) may be generated for the user to enter recovery parameters for performing the selected recovery.

Figure 3:
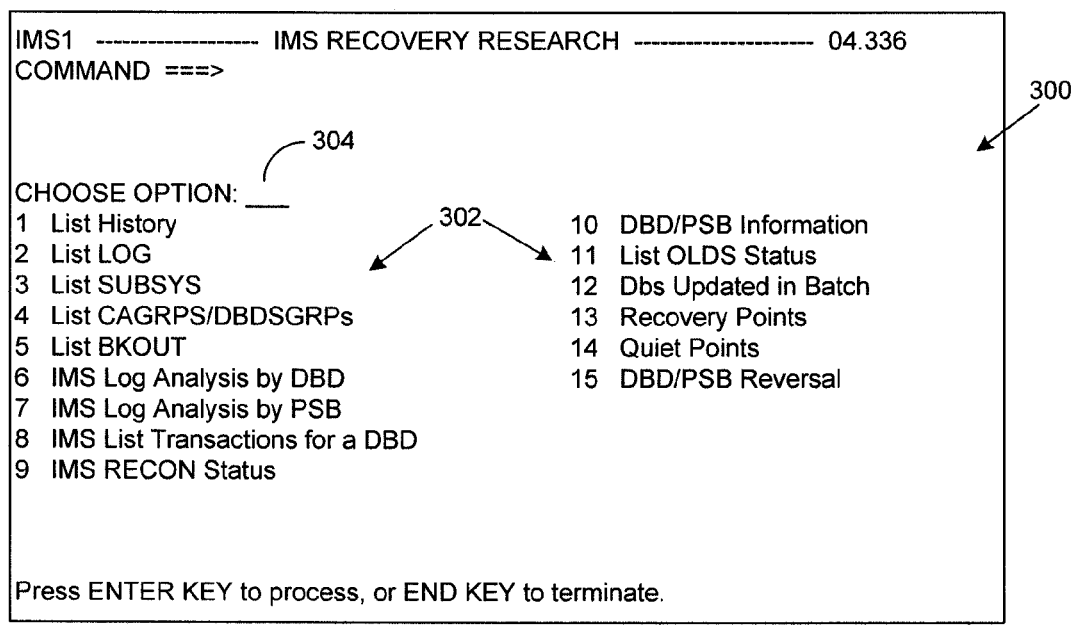
FIG. 3 is a screenshot of an exemplary database recovery research menu that enables a user to select from a list of database recovery research options.

FIG. 3 is a screenshot of an exemplary database recovery research menu 300 that enables a user to select from a list of database recovery research options 302. As shown, a list of database recovery research options 302 are provided for a user to select a database recovery research option. For example, the database recovery research options include List History, List LOG, List SUBSYS, etc. These database recovery research options 302 may be produced by one or more software developers and enable a user to perform a number of IMS recovery research efforts without having to generate a JCL command file and control card for each one. To select a particular IMS database recovery research option, the user may enter a respective number in text entry field 304.

FIG. 4 is a screenshot of an exemplary database recovery parameter entry screen 400 that enables a user to enter parameters associated with the IMS recovery research option "Recovery Points" of FIG. 3. The database recovery parameter entry screen 400 enables a user to enter parameters that enables the software read an IMS database recovery log (recon) and print a report of DEALLOCs (de-allocations) and ALLOCs (allocations) for requested databases. The utility may be used by a user to find standard recovery points for databases, where a standard recovery point is a time during which the database is idle so that resetting or performing other operations on the database at those points will not have a problem due performing an operation at a time that an action was being performed on the database. The user may select a type of object by entering "D" for database definitions (DBDs), "G" for database set groups, and "P" for program specification blocks (PSBs) into text entry field 402. Recovery points may be searched over a range of times for a report by the user entering starting and ending times in text entry fields 404 and 406 using a format of yydddhhmmsst. Source of the objects may be selected by a user entering "D" to provide a data set with the object names in text entry field 410 or "P" to enter the objects on the panel in text entry fields 412. In response to the user pressing, "ENTER," JCL commands are displayed and the job is submitted when the PF3 key is pressed. The user may view output from the job, where the output may be in the form of two exemplary reports, a Recovery Point Widows (TABLE I) and Recon Analysis Report (TABLE II).

TABLE I

IMS Recovery Point Windows Report

IMS DATABASE RECOVERY POINT WINDOWS
1999070 00:00:00.0 to 1999084 14:30:56.2
14:34 Thursday, March 25, 1999
DBD = DS$0TRAN

| DDN | FROM TIME (DEALLOC) | TO TIME (ALLOC) | TYPE |
|---|---|---|---|
| DS$0TRAN | | 1999.071 07:07:47.4 | TIMESTAMP RECOVERY |
| DS$0TRAN | 1999.071 07:09:39.8 | 1999.071 07:09:39.8 | DEALLOC |
| DS$0TRAN | 1999.071 07:19:13.6 | 1999.071 07:19:13.6 | BATCHIMAGE COPY |
| DS$0TRAN | 1999.071 07:19:13.6 | 1999.071 07:35:04.3 | TIMESTAMP RECOVERY |

TABLE II

IMS Recon Analysis Report

IMS RECON ANALYSIS REPORT
1999070 00:00:00.0 to 1999084 14:30:56.2
14:34 Thursday, March 25, 1999
DBD = DS$0TRAN

| DDN | SSID | START | END |
|---|---|---|---|
| DS$0TRAN | jobname | 1999.070 00:38:33.1 | 1999.070 01:18:48.8 |

As shown in TABLE I, anytime between the "from" (dealloc) and "to" (alloc) times can be used as a recovery point timestamp. This recovery point window list enables a user to enter any of the recovery timestamps for recovering a database (see FIG. 5). Batch Image Copy or DEALLOC can be used as a recovery point. As shown in TABLE II, any DLI batch jobs that ran during the times requested and their start and end times are provided in the IMS Recon Analysis Report.

FIG. 5 is another screenshot of an exemplary database recovery parameter entry screen 500 for a user to enter parameters and run a database recovery operation job. The parameter entry screen 500 enables a user to enter a Recover to Time (timestamp) parameter, which is a database recovery point, in text entry field 502. A number of other parameters 504, including SMF Account Number, JOB Run Type (e.g., production), JOB Programmer Name, JOB Execution Class, JOB MSGCLASS, and whether to perform recovery or scan. In addition, multiple databases (e.g., 53 databases) may be entered in text entry fields 506 for a user to recover up to the timestamp database recovery point entered in text entry field 502.

After the database recovery parameters are entered, the user may press ENTER and a JCL file is created in a JCL command file (e.g., DBA.JCLLIB) and displayed in edit mode to enable the user to edit the file. An exemplary JCL command file is presented below in TABLE III.

TABLE III

Exemplary JCL Command File Generated by Database Recovery Screen

```
//DSTRAN$R JOB (7019,TEST),'OPERATIONS',MSGCLASS=R,
//        CLASS=B,
//        SCHENV='NPROD_IMS5'
//*   BMC RECOVERY PLUS
//RECOV EXEC PGM=RVPUMAIN
//STEPLIB DD DISP=SHR,DSN=SYSM.IMS05.PRODUCTS
//       DD DISP=SHR,DSN=IMS05.PRD01.RESLIB
//       DD DISP=SHR,DSN=IMS05.PRD01.DYNALLO.LOADLIB
//IMS    DD DISP=SHR,DSN=IMS05.PRD01.DBDLIB
//DFSRESLB DD DISP=SHR,DSN=IMS05.PRD01.RESLIB
//DFSURWF1 DD UNIT=DISK,SPACE=(CYL,(300,100))
//AMSPDS DD DISP=SHR,DSN=RDC.DELDEF
//PULLLIST DD SYSOUT=A,FREE=CLOSE,DEST=P0470127
//SYSPRINT DD SYSOUT=*
//SYSOUT DD SYSOUT=*
//* >>>>>>>>>>>>>>>>>>>>>>>>>>>><<<<<<<<<<<<<<<<
//* NOTE: DELETE 'SCAN(Y) AUTH(N)' LINE TO PERFORM
RECOVERY
//* >>>>>>>>>>>>>>>>>>>>>>>>>>>><<<<<<<<<<<<<<<<
//RVPSYSIN DD *
GLBL TIMESTAMP (20040900800000-xx00)
     SCAN(Y) AUTH(N) - <<remove this line to perform recovery
     STR(Y) GRPLIM(3) RDRS(3) IDCAMS(*) BLDINDEX(Y)
SORT SORT(SRT1) NBUF(50)
SORT PSORT(SRT2) NBUF(50)
ARECDBD(CBM0CRDB) LOG(*) DUMP(*) ACCUM(*) -
     IC(*) ICPREF(MWG)
```

The user may edit the JCL command file to make modifications. For example, if an offset is to be made on the timestamp (-xx00), the user may edit the timestamp in the JCL command file. After making modifications to the JCL command file, the user may submit the database recovery operation job by typing "SUB" in the command text entry field 508. Output from the job may be reviewed by entering system display and search facility (SDSF) provided on the mainframe.

Figure 6:
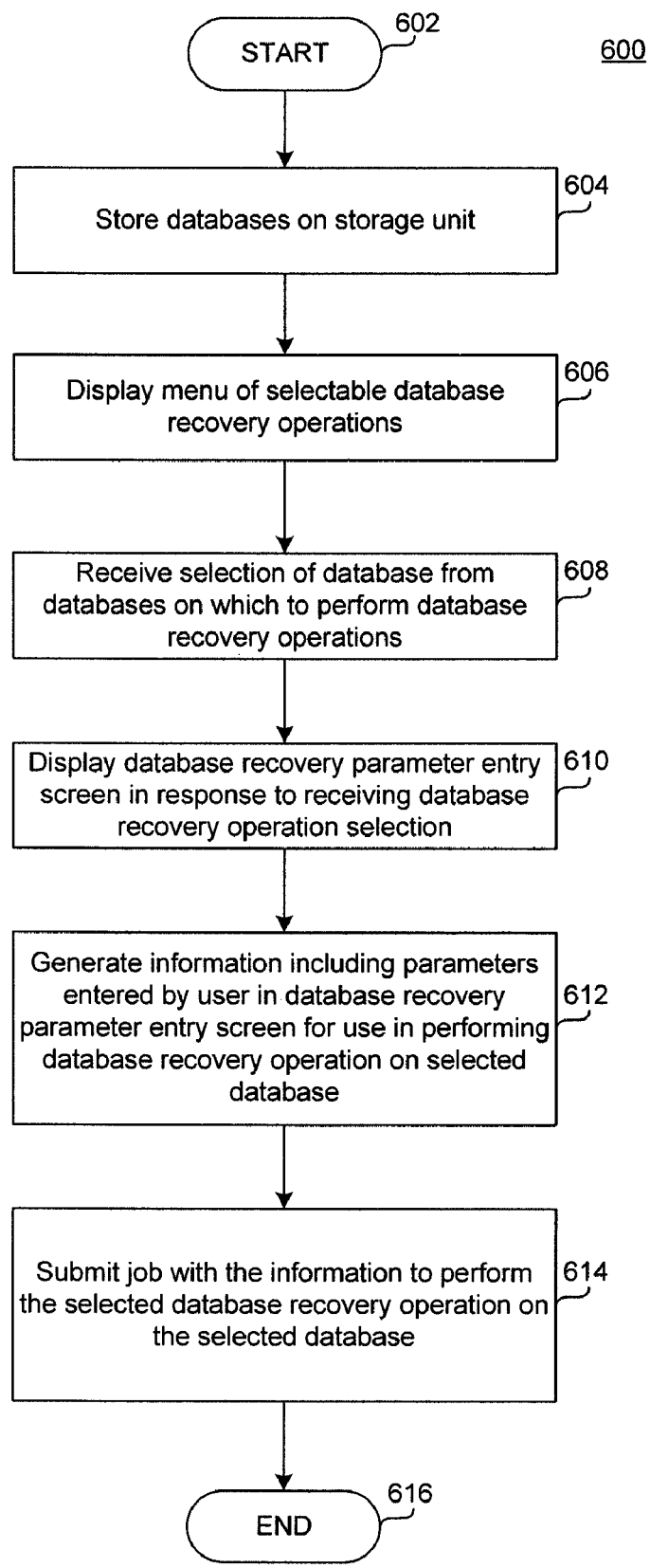
FIG. 6 is a flow diagram of an exemplary process for performing a database recovery operation.

FIG. 6 is a flow diagram of an exemplary process 600 for performing a database recovery operation. The process 600 starts at step 602. At step 604, databases are stored on a storage unit. The databases may be copied, duplicated, initialized, or otherwise stored on the storage unit. The databases may have the same or different name. In one embodiment, a set of databases are production databases and other databases are test or development databases. At step 606, a menu of selectable database recovery operations are displayed. The selectable database recovery operations may be any operation that is directly or indirectly used for recovering a database, including performing database investigation operations (e.g., database log, list, reset, etc.).

At step 608, a selection of a database from the databases stored on the storage unit on which to perform database recovery operations may be received. The selection may be in the form of a name or indicia indicative of a particular database. At step 610, a database recovery parameter entry screen may be displayed in response to receiving the database recovery operation selection may be displayed. The screen may be a listing or other display in the same or different screen or window that enables a user to enter or select database recovery parameters. At step 612, information including parameters entered by the user in the database recovery parameter entry screen for use in performing a database recovery operation on the selected database may be generated. The information may include JCL commands and stored in a JCL command file. The database recovery parameters entered may be stored in the JCL command file so that a control card is not utilized for execution of the database recovery operation. A job may be submitted with the information to perform the selected data base recovery operation on the selected database at step 614. The process 600 ends at step 616.

In addition to the principles of the present invention streamlining the process for preparing and using database recovery operations, results of the database recovery operations may be provided in an easy to read format. As database administrators have come to realize, reports generated by existing database recovery operations are difficult to read and interpret because they are filled with unnecessary information and have formats that are not conducive to quick analysis and review. These reports can be 60 pages or longer due to the extra information and format. The software 106 of FIG. 1 may include a parsing engine that receives the results of a database recovery operation after being executed, parse the information to collect a reduced set of information that is relevant for a user to quickly and easily determine the results of the database recovery operation. The reduced set of results may be included in a table of rows and columns to enable the user to easily scan the results. By generating a table with a reduced set of result information, the number of pages of results may be significantly reduced and the user may more easily review the results.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for performing database recovery operations, said system comprising:
a mainframe computer, including:
a storage unit;
a plurality of databases stored on said storage unit;
a processing unit configured to receive and schedule jobs submitted for execution;
an electronic display in communication with said processing unit; and
a software program executed by said processing unit and configured to cause the processing unit to:
display a menu of selectable database recovery operations on said electronic display;
receive a selection of a database of the plurality of databases on which to perform a database recovery operation;
display a list of valid database recovery timestamps;
display a database recovery parameter entry screen in response to receiving a database recovery operation selection; and
generate information including parameters entered in the database recovery parameter entry screen for use in performing the selected database recovery operation on the selected database.

2. The system according to claim 1, wherein said at least one database is an information management system (IMS) database.

3. The system according to claim 1, wherein the generated information enables said processing unit to generate a JCL command file and associated control card.

4. The system according to claim 1, wherein the software is further configured to enable a user to select a database on a second mainframe computer on which to execute the selected database recovery operation.

5. The system according to claim 4, wherein the second mainframe computer stores a plurality of databases, the selected database recovery operation may be performed on a selected one of the databases stored on the second mainframe computer.

6. The system according to claim 1, wherein the menu of selectable database recovery operations includes database recovery operations of multiple database recovery operation developers.

7. The system according to claim 1, wherein the software is further configured to submit a job including the information.

8. The system according to claim 1, wherein the software is further configured to generate a report having rows and columns including information representative of results from the selected database recovery operation performed on the selected database.

9. The system according to claim 8, wherein the software further includes a parsing engine configured to parse data generated by the respective database and collect selected parsed data for inclusion in the report.

10. A method for performing database recovery operations on a database, said method comprising:
storing a plurality of databases on a storage unit;
displaying a menu of selectable database recovery operations;
receiving a selection of a database of the plurality of databases on which to perform a database recovery operation;
displaying a list of valid database recovery timestamps
displaying a database recovery parameter entry screen in response to receiving a database recovery operation selection;
generating information including parameters entered by a user in the database recovery parameter entry screen for use in performing a database recovery operation on a selected database; and
submitting a job with the information to perform the selected database recovery operation on the selected database.

11. The method according to claim 10, wherein storing the at least one database includes storing an IMS database.

12. The method according to claim 10, wherein generating the information includes generating a JCL command file and associated control card.

13. The method according to claim 10, further comprising enabling a user to select a hierarchical database on which to execute the selected database recovery operation.

14. The method according to claim 13, further comprising enabling the user to select a location at which the selected database is located.

15. The method according to claim 10, wherein displaying a menu of selectable database recovery operations includes displaying database recovery operations of multiple database recovery operation developers.

16. The method according to claim 10, wherein storing plurality of databases includes storing multiple databases on multiple mainframe computers.

17. The method according to claim 10, further comprising generating a report having rows and columns of information representative of results from the selected database recovery operation performed on the selected database.

18. The method according to claim 17, further comprising:
parsing data generated by the respective function performed on the selected database; and
collecting selected parsed data for inclusion in the report.

* * * * *